United States Patent
Friedman

(10) Patent No.: US 11,325,453 B2
(45) Date of Patent: May 10, 2022

(54) BATTERY MOUNTING BRACKET FOR HEAVY DUTY VEHICLE

(71) Applicant: Toyota Motor Engineering & Manufacturing North America, Inc., Plano, TX (US)

(72) Inventor: Scott A. Friedman, Dallas, TX (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 94 days.

(21) Appl. No.: 16/718,677

(22) Filed: Dec. 18, 2019

(65) Prior Publication Data
US 2021/0188069 A1 Jun. 24, 2021

(51) Int. Cl.
| | |
|---|---|
| *B60K 1/00* | (2006.01) |
| *B60K 1/04* | (2019.01) |
| *B60L 50/64* | (2019.01) |
| *B62D 21/09* | (2006.01) |
| *B62D 27/06* | (2006.01) |
| *B62D 21/02* | (2006.01) |
| *H01M 50/20* | (2021.01) |

(52) U.S. Cl.
CPC ............. *B60K 1/04* (2013.01); *B60L 50/64* (2019.02); *B62D 21/02* (2013.01); *B62D 21/09* (2013.01); *B62D 27/06* (2013.01); *H01M 50/20* (2021.01); *H01M 2220/20* (2013.01)

(58) Field of Classification Search
CPC .......... B60K 1/04; B62D 21/02; B62D 21/09; B62D 21/06; B62D 29/008; B62D 21/00; B60L 50/64
See application file for complete search history.

(56) References Cited

U.S. PATENT DOCUMENTS

| | | | | |
|---|---|---|---|---|
| 6,227,322 | B1 * | 5/2001 | Nishikawa | ........... B62D 29/008 180/68.5 |
| 7,070,015 | B2 * | 7/2006 | Mathews | .............. B60L 3/0007 180/68.5 |
| 7,717,207 | B2 * | 5/2010 | Watanabe | ............... B60L 50/66 180/68.5 |
| 8,051,934 | B2 | 11/2011 | Kiya et al. | |
| 8,210,301 | B2 | 7/2012 | Hashimoto et al. | |
| 9,027,684 | B2 * | 5/2015 | Araki | ...................... B60K 1/04 180/68.5 |

(Continued)

*Primary Examiner* — Hau V Phan
(74) *Attorney, Agent, or Firm* — Christopher G. Darrow; Darrow Mustafa PC

(57) ABSTRACT

A mounting system is provided for positioning a battery in a vehicle, particularly between frame rails of a vehicle chassis. The system includes a battery housing that may include a base portion on which at least one battery is placed, a cover portion, and a side wall perimeter portion extending between the base portion and cover portion. A plurality of mounting brackets are coupled to the battery housing and configured for removably securing the battery housing to a structural component of the vehicle in a manner that allows for limited movement of the structural component, such as minor twisting of frame rails, without the displacement of the battery housing. Each mounting bracket may include at least one flexible portion that is elastically positioned to conform to a shape of at least a portion of the structural component. Methods for securing the battery housing in a vehicle chassis are also disclosed.

18 Claims, 7 Drawing Sheets

(56) References Cited

U.S. PATENT DOCUMENTS

| | | | |
|---|---|---|---|
| 9,139,074 B2* | 9/2015 | Jarocki | B60L 3/0007 |
| 9,592,724 B1* | 3/2017 | Trujillo | B62D 21/00 |
| 9,662,965 B2 | 5/2017 | Poillot et al. | |
| 9,963,028 B1* | 5/2018 | Pachore | B60K 1/04 |
| 10,207,574 B2* | 2/2019 | Ozawa | H01M 50/20 |
| 10,300,788 B2* | 5/2019 | Nishiumi | B60L 50/71 |
| 10,494,030 B1* | 12/2019 | Paramasivam | B62D 25/20 |
| 10,583,746 B2* | 3/2020 | Ogaki | B60L 50/66 |
| 10,773,583 B2* | 9/2020 | Fukui | B62D 21/03 |
| 2007/0196957 A1* | 8/2007 | Akutagawa | H01L 24/97 |
| | | | 438/127 |
| 2009/0145676 A1* | 6/2009 | Takasaki | H01M 50/20 |
| | | | 180/65.1 |
| 2010/0147608 A1* | 6/2010 | Okabe | H01M 8/247 |
| | | | 180/65.31 |
| 2010/0187027 A1* | 7/2010 | Komaki | H01M 50/20 |
| | | | 180/65.21 |
| 2011/0222240 A1* | 9/2011 | Kawata | H01M 10/6566 |
| | | | 361/690 |
| 2014/0165354 A1 | 6/2014 | Ojima et al. | |
| 2015/0151624 A1 | 6/2015 | Yamada et al. | |
| 2015/0197144 A1 | 7/2015 | Jarocki | |
| 2016/0344058 A1* | 11/2016 | Naito | B60L 58/33 |
| 2016/0355100 A1* | 12/2016 | Ito | H01M 50/20 |
| 2017/0120760 A1* | 5/2017 | Kume | B60L 3/0015 |
| 2018/0056769 A1 | 3/2018 | Kerspe et al. | |
| 2018/0237075 A1* | 8/2018 | Kawabe | B60K 1/04 |
| 2019/0084441 A1* | 3/2019 | Khan | B60L 50/64 |

\* cited by examiner

BATTERY MOUNTING BRACKET FOR HEAVY DUTY VEHICLE

TECHNICAL FIELD

The present disclosure generally relates to battery mount systems for heavy duty vehicles and, more particularly, to flexible mounts or mounting brackets for locating a battery housing containing high voltage batteries adjacent a frame or structural component of a heavy duty vehicle, and methods for installing and removing the battery housings.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Various electric vehicles, including heavy duty vehicles, use one or more high voltage battery as a power source. Depending on their size, high voltage batteries can easily weigh between 200-400 kg, or more. Such batteries are commonly provided in a battery housing or battery enclosure, which may be coupled to at least one component of the vehicle, such as a frame/chassis, for rigidity and structural integrity. At periodic intervals, access to the batteries may be needed for maintenance and/or replacement. Due to the size and weight, various battery housings or battery enclosures are loaded and unloaded from underneath the vehicle using a hoist or other lift-assist device. Individual fasteners may be provided with the battery housing or battery enclosure to secure the battery housing either to various mounts, such as brackets, or directly to the frame/chassis. The mounting brackets, however, are typically welded onto the battery housing or chassis/frame, and the various fastening points are often cumbersome to work with and they are not easily adjustable.

Accordingly, it would be desirable to provide improved battery mounts that are useful with current techniques for loading, unloading, and mounting high voltage battery housings, while minimizing and/or eliminating any additional welding, and while further reducing noise, vibrations, and harshness (NVH).

SUMMARY

This section provides a general summary of the disclosure, and is not a comprehensive disclosure of its full scope or all of its features.

In various aspects, the present teachings provide a battery housing for securing a plurality of batteries to a structural component of a vehicle. The battery housing may include a base portion configured to receive at least one battery, a cover portion, and a side wall perimeter portion extending between the base portion and the cover portion. A plurality of mounting brackets are provided coupled to the battery housing and configured for removably securing the battery housing to the structural component of the vehicle. Each mounting bracket may include at least one flexible portion and is configured to permit limited movement between the battery housing and the structural component. In various aspects, the flexible portion of each mounting bracket is configured to be elastically positioned and conformed to a shape of at least an upper portion of the structural component of the vehicle.

In other aspects, the present teachings provide a mounting assembly for retaining a battery housing in a vehicle. The mounting assembly may include a vehicle frame chassis having at least two opposing frame rails. A battery housing is disposed between the two opposing frame rails. A plurality of mounting brackets are coupled to the battery housing and configured for removably securing the battery housing to the two opposing frame rails of the vehicle frame chassis. Each mounting bracket may include at least one flexible portion that is positioned to conform to a shape of at least a portion of the respective frame rail. In various aspects, the battery housing includes a base portion configured to receive at least one battery, a cover portion, and a side wall perimeter portion extending between the base portion and cover portion. The frame rails may be provided having a substantially I-shaped or C-shaped cross-section, or similar geometry variations.

In still other aspects, the present teachings provide a method for removably securing a battery housing in a vehicle using a flexible bracket mounting system. The method may include guiding the battery housing to a position between opposing frame rails of a vehicle frame chassis. In various aspects, the battery housing includes a plurality of mounting brackets. Each mounting bracket may be provided with at least one flexible portion. The method may include shaping the flexible portions of the plurality of flexible mounting brackets to conform to a shape of a portion of the respective opposing frame rails. The method also includes securing the plurality of mounting brackets to portions of the respective opposing frame rails of the vehicle frame chassis. For example, the methods may include securing each upper flexible portion to an upper portion of the respective opposing frame rails, and securing each lower flexible portion to a lower portion of the respective opposing frame rails. In various aspects, the plurality of mounting brackets are configured to permit limited movement of the battery housing during any movement of the opposing frame rails with respect to one another.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
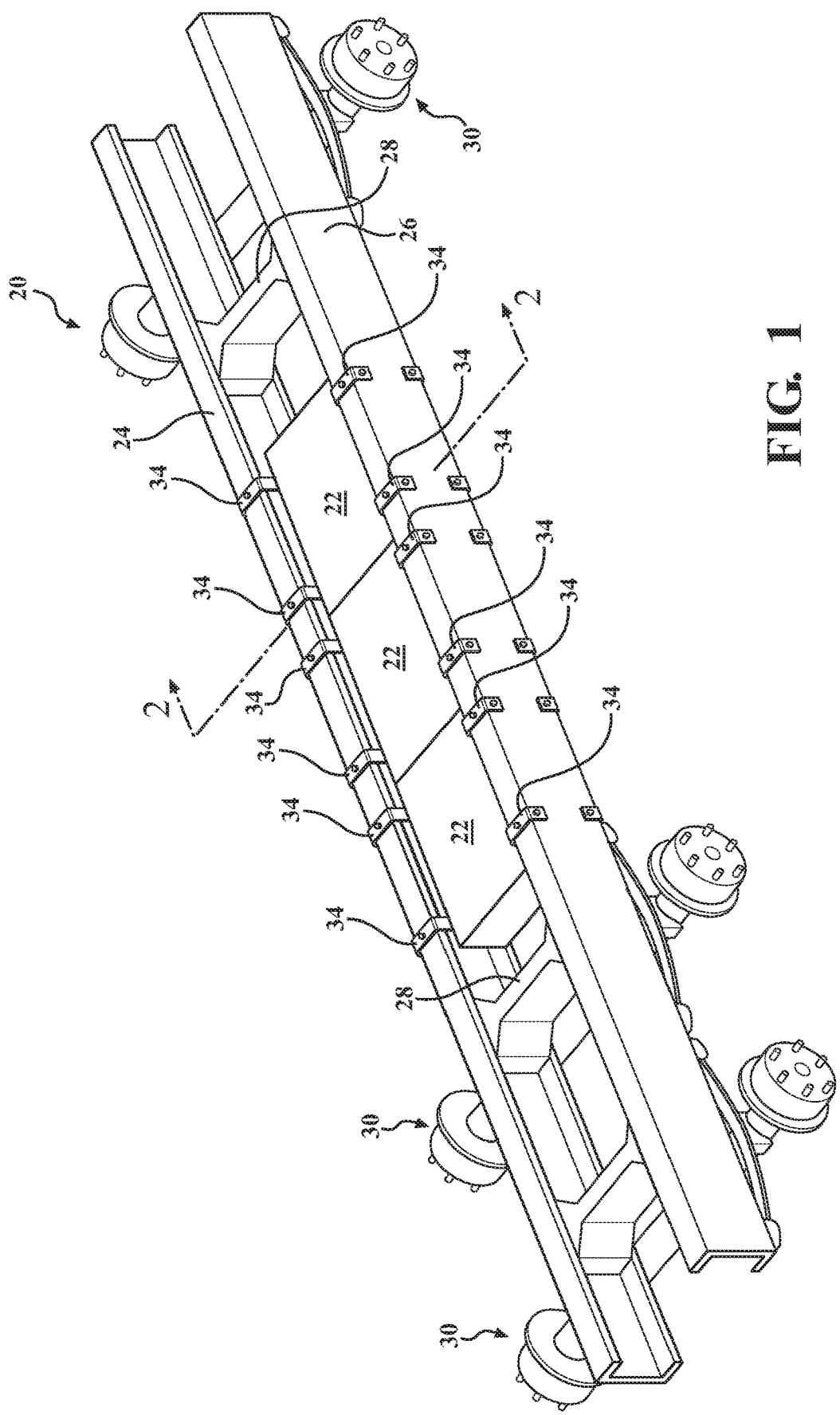
FIG. 1 is a top perspective view of an exemplary vehicle chassis of a heavy duty truck illustrating a battery housing secured between opposing side frame rails according to the teachings of the present technology.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally relates to battery housings (also known as battery casings, battery enclosures, or battery mounting structures), flexible/elastic mounting brackets, and mounting systems that can be useful in securing battery housings used in electric vehicles, particularly including heavy duty vehicles, trucks, and the like. High voltage batteries for electric vehicles, for example, are commonly housed in a large battery housing that is located within the vehicle. In a passenger vehicle, for example, a battery housing may be mounted on an under-floor side of a vehicle body floor. In a heavy duty vehicle or truck, one or more battery housing(s) may be coupled to a structural component of the heavy duty vehicle or truck, such as a chassis or frame component. Due to their size and weight, the battery housings are typically loaded and unloaded from underneath the vehicle, which may include using a hoist or other assist device such as a forklift. The mounting brackets of the present technology have flexible and/or elastic characteristics in order to assist with the installation and removal of a battery housing or battery enclosure. In various aspects, the systems and mounting brackets of the present technology may be provided with an adjustable/modular fastening point, eliminating the need for mounting brackets to be welded to the battery housing or battery enclosure. For example, exemplary systems can include a plurality of substantially C-shaped, modular mounting brackets that are strategically positioned around a perimeter of a battery housing or battery enclosure. As will be described in more detail below, the mounting brackets may be either integrated with the battery housing and/or mechanically fastened thereto in a modular fashion, where different mounting brackets can be used for different battery housing and vehicle combinations. This type of mounting bracket system should provide better access to the battery housing and surrounding area, as well as making the installation/removal process easier and more efficient.

In addition to a plurality of mounting brackets being integrated with or coupled to the battery housing and configured for removably securing the battery housing to a structural component(s) of the vehicle, the present technology provides for securing the battery housing in a manner that allows for limited movement of the structural components, such as minor twisting of frame rails, without any damaging displacement of the battery housing from its safe storage location, such as between frame rails of a vehicle chassis. For example, the battery housing may incur limited movement coordinated with movement or limited twisting/flexing (e.g., up to about 7% from end-to-end of a chassis) of the structural components to which it is attached, but not sustain any structural impairment. In various configurations, it is contemplated that the battery housing may incur forces from loads/shocks of up to about 5G in the vertical (z) direction, up to about 2G in the lateral (y) direction, and up to about 10G in the longitudinal (x) direction. The design of the mounting brackets will assist in absorbing vibration and minimize any affects from limited frame twisting/flexing. In some aspects, the battery housing may be considered to "float" between the structural components, without contacting the structural components due to the use of flexible or elastic mounting brackets.

It should be understood that while the present technology may be specifically referenced with regard to use with heavy duty vehicles and trucks, the present technology is also useful with passenger vehicles as well as other commercial vehicles. As used herein, the term "vehicle" is not meant to be limiting or construed narrowly, and should include all types of things used for transporting people or goods, with non-limiting examples including a car, truck, motorcycle, off-road vehicle, bus, boat, airplane, helicopter, lawn mower, recreational vehicle, amusement park vehicle, farm vehicle, construction vehicle, tram, golf cart, train, trolley, and the like. It should also be understood that use of the term "vehicle" is meant to include all types of powered vehicles, including electric vehicles, hybrid vehicles, and conventional fuel powered vehicles having an internal combustion engine that also include one or more battery.

FIG. 1 is a top perspective view of an exemplary vehicle chassis 20 of a heavy duty truck illustrating a plurality of battery housings 22 secured between opposing side frame rails 24, 26 according to various teachings of the present technology. While shown with three battery housings 22 adjacent one another, the present technology can be used with any number of battery housings 22, and the each battery housing 22 may be located in different locations, not necessarily adjacent to one another. The vehicle chassis 20 may be provided with various cross-members 28 for structural rigidity as is known in the art. In this specific example, the vehicle chassis 20 is shown with three axle assemblies 30, and two side storage tanks 32, which may be used for hydrogen gas storage, fuel for a supplemental internal combustion engine, and the like.

Figure 2:
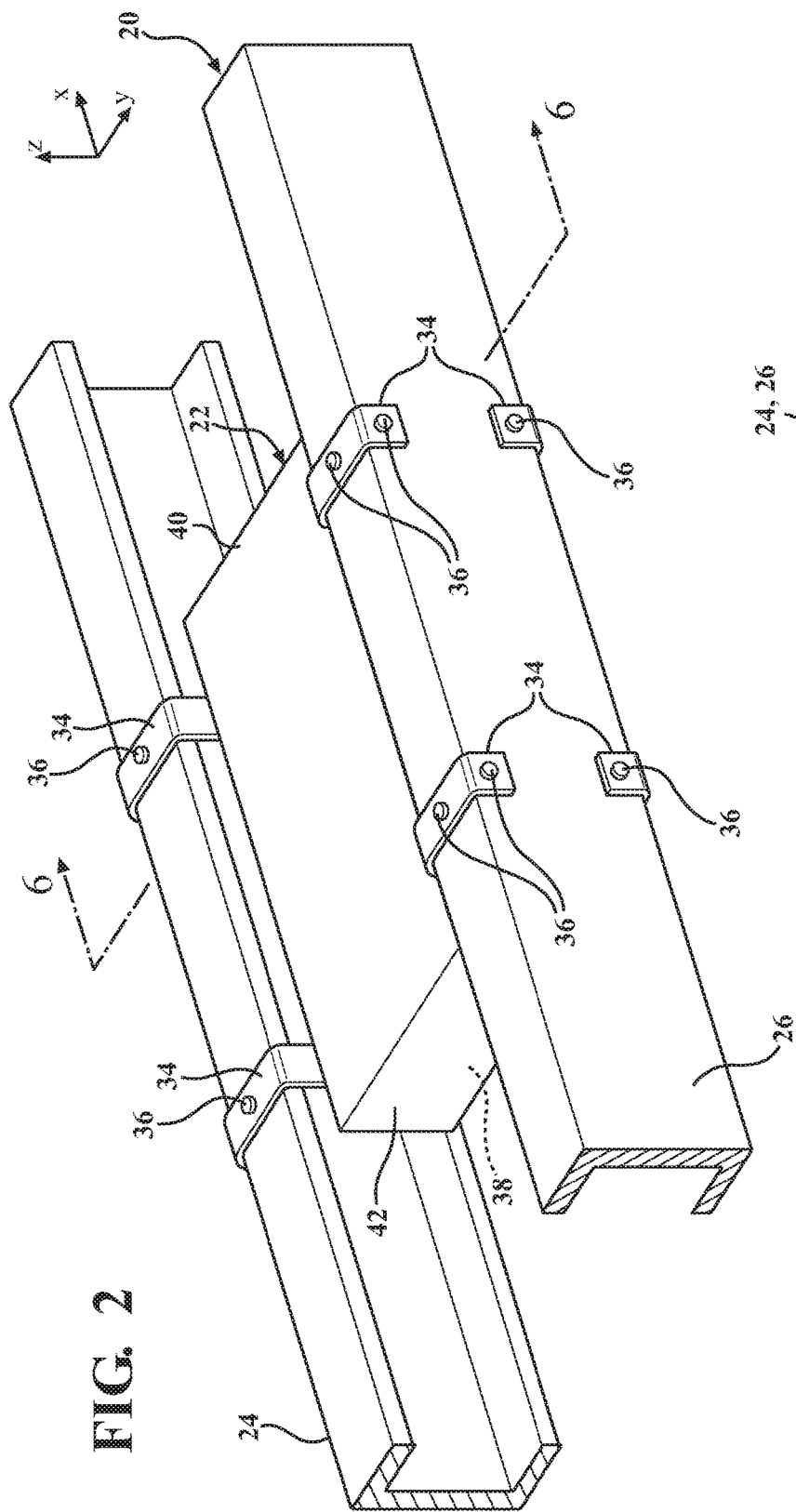
FIG. 2 is a magnified view of a portion of a vehicle chassis similar to FIG. 1 and providing additional details of the battery housing being secured to the opposing frame rails.

FIG. 2 is a magnified view of a portion of a vehicle chassis 20 similar to the design presented in FIG. 1 and providing additional details of the battery housing 22 being secured to the opposing frame rails 24, 26 with mounting brackets 34 located at fastening areas. The overall shape and design of the battery housing 22 may vary depending on design considerations for each specific vehicle, the power requirements, and the type of battery modules and cells used, among other things. As such, the presentation of a generally rectangular box-type shape is only one exemplary design that can be used for placement between opposing frame rails 24, 26 of a vehicle chassis 20. In general, the battery housing 22 may be provided with a bottom or base portion 38 configured to receive and/or support at least one battery cell or battery module having a plurality of cells. An upper, or cover portion 40 is generally provided as the upper major surface of the battery housing 22. As shown, a side wall perimeter portion 42 is provided extending between the base portion 38 and the cover portion 40. It should be understood that while the battery housing 22 is described herein as having different portions, certain of the portions may be combined together as structural pieces or components. In other words, each portion may not be a separate component. In certain aspects, the base portion 38 may be provided as a substantially planar structure, configured for receiving the battery modules or cells, and the side wall perimeter portion 42 may be integral or otherwise combined with the cover portion 40 and together coupled to the base portion 38. In other aspects, the cover portion 40 may be provided as a separate component, with the base portion 38 being integral or otherwise combined with the side wall perimeter portion 42, cooperating to receive and house the battery modules or cells. The separate components of the battery housing 22 can be joined together using known techniques suitable for the purpose of safely containing the battery modules or cells. The battery housing 22 may be made of any suitable material, including plastics, metals, composites, and combinations of the same. The battery housing 22 may be provided with various vents, electrical connections, ports, and coupling components (not specifically shown or numbered).

As shown in FIG. 2, the battery housing 22 may be removably fastened or coupled to the opposing side frame rails 24, 26 with a plurality of mounting brackets 34. In many instances, there may be a minimum of four mounting brackets 34 used, placed in strategic fastening point locations, such as near corner areas of the battery housing 22 so as to evenly distribute weight, balance, center of gravity, and the like. In various aspects, the mounting brackets 34 may be integrated with, mechanically fastened to, or otherwise coupled to the battery housing 22, and are configured for removably securing the battery housing 22 to the respective structural component of the vehicle. In various aspects and as will be described in more details below, each mounting bracket 34 may include at least one flexible portion that is generally configured to permit limited flexural and/or elastic movement between the battery housing 22 and the structural component(s). The mounting brackets 34 can be manufactured of various materials, depending on whether the mounting brackets 34 will have a pre-formed shape or be shaped after installation. Exemplary materials include plastics, metals, composites, and combinations thereof.

Figure 3:
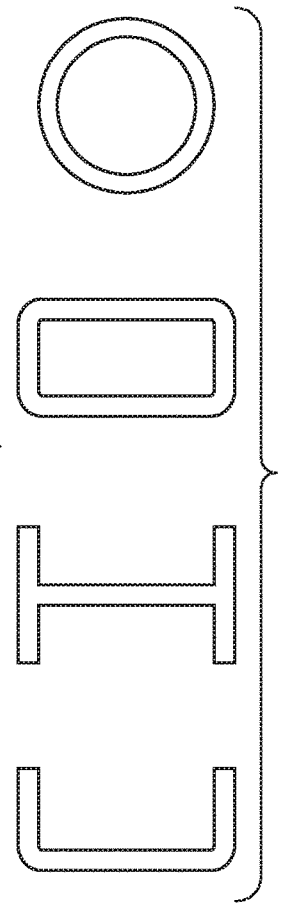
FIG. 3 illustrates various cross-section views of exemplary frame rail designs that may be useful with the present technology.

FIG. 3 illustrates various cross-section views of exemplary frame rail 24, 26 and cross-member 28 designs that may be useful for serving as structural components to which the battery housing 22 is secured. As shown from left to right, the present technology may be useful with frame rails having a substantially C-shape, I-shape, rectangular/box shape, and a tubular or O-shape. Of course, the specific type, design, and geometry of the frame rails may also vary based on the particular vehicle or structural configuration, and are not limited to the aspects shown in FIG. 3.

Figure 4:
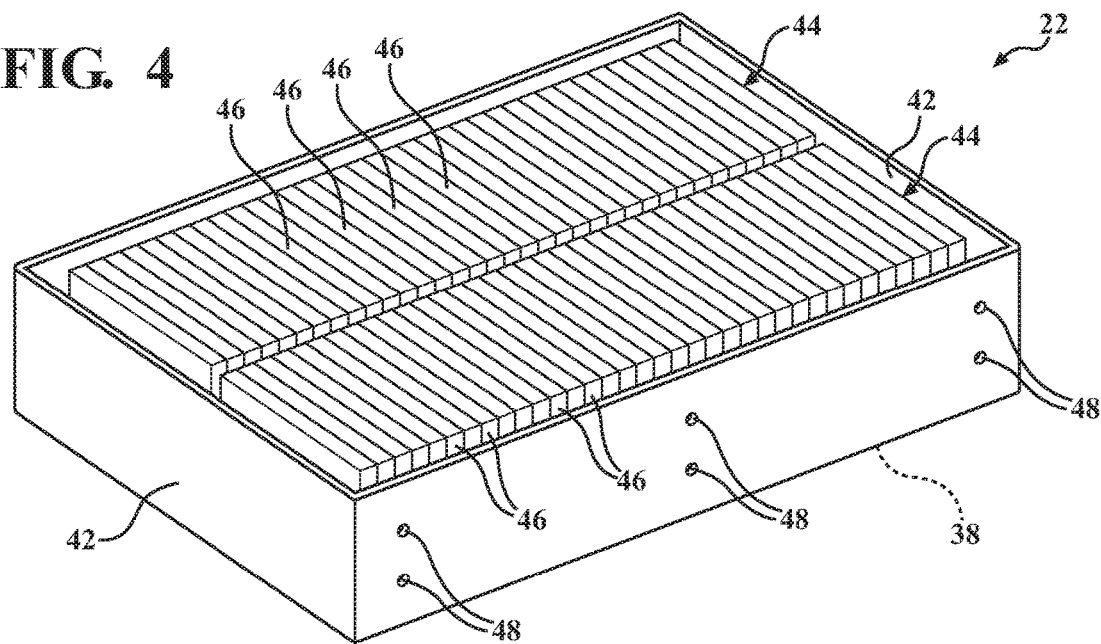
FIG. 4 is perspective view of a portion of battery housing, and illustrating two battery modules and a plurality of battery cells disposed therein.

FIG. 4 is perspective view of a portion of battery housing 22, with the cover portion 40 not shown, illustrating two battery modules 44, each having a plurality of individual battery cells 46 disposed therein. The number and type of battery modules 44 as well as the number and type of battery cells 46 is not limiting, and can vary based on the type of vehicle and various power requirements.

Figure 5A:
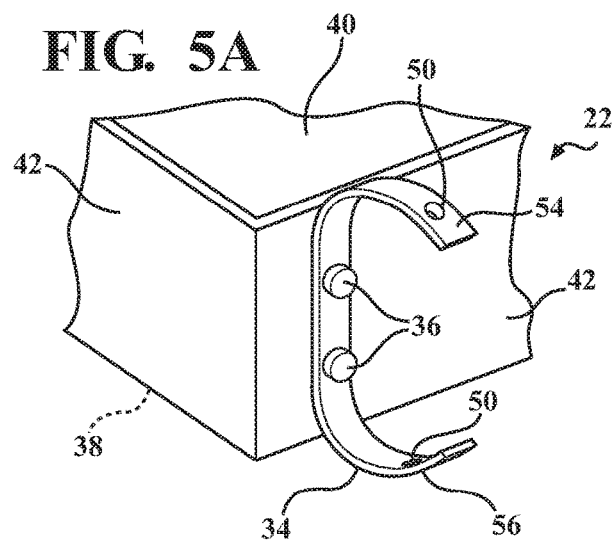
FIGS. 5A-5C illustrate various aspects of a mounting bracket coupled to a corner area of the battery housing.
Figure 5B:
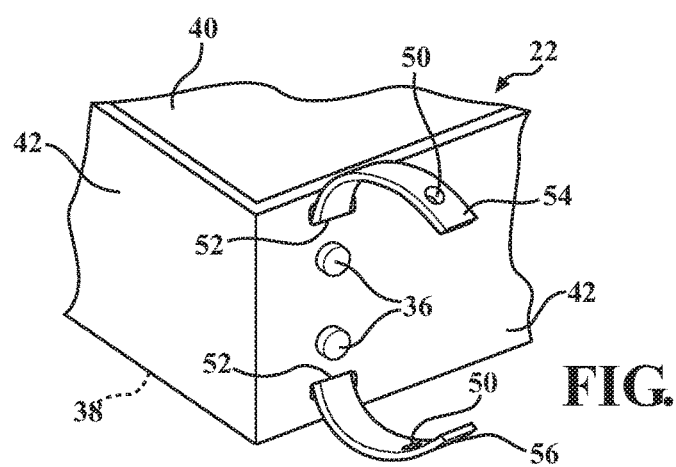
Figure 5C:
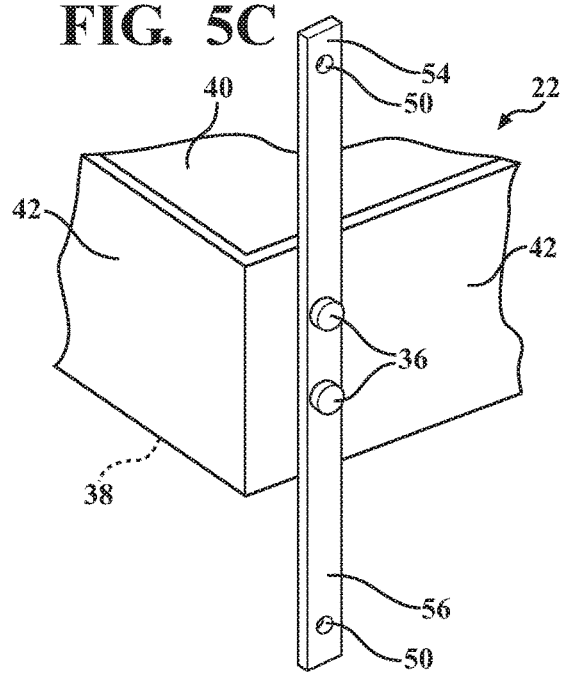

FIGS. 5A-5C illustrate various different aspects of a mounting bracket 34 coupled to a corner area of the battery housing 22. The mounting brackets 34 may be fastened to an exterior portion of the battery housing 22, for example to an exterior of the side wall perimeter portion 42, or fastened to an interior of the side wall perimeter. FIG. 5A illustrates one exemplary mounting bracket 34 with a middle portion secured adjacent to an exterior of the side wall perimeter portion 42 of the battery housing 22. For example, mechanical fasteners 36 or bolts may be used with apertures 48 defined in the battery housing 22 to secure the mounting bracket 34 to the battery housing 22. Additional apertures 50 defined in the mounting brackets 34 may then be used with suitable fasteners to secure the mounting bracket 34 to the structural component of the vehicle, such as the opposing frame rails 24, 26. FIG. 5B illustrates an exemplary mounting bracket 34 with a middle portion secured adjacent to an interior of the side wall perimeter portion 42 of the battery housing 22. The battery housing may be provided with additional apertures 52, such as a slot or extended opening, to permit the ends of the mounting brackets 34 to be located external of the battery housing 22. While the apertures 52 are specifically shown as being located in the side wall perimeter portion 42, the apertures 52 can also be located in the cover portion 40 or the base portion 38 of the battery housing 22. In certain aspects, it may be desired that at least a portion of the mounting bracket 34 is disposed within an interior of the battery housing 22 but it not mechanically or otherwise fastened to the battery housing 22. In this regard, the mounting bracket 34 is permitted to move with respect to the battery housing 22, for example, during a limited twisting/flexing of the structural component to which it is attached. Similar to FIG. 5A, mechanical fasteners 36 or bolts may be used with apertures 48 defined in the battery housing to secure the mounting bracket 34 to the battery housing 22.

The mounting bracket 34 of FIGS. 5A and 5B illustrate a first aspect of a mounting bracket 34 having upper and lower flexible portions 54, 56 that may be curved, or otherwise pre-shaped prior to installation of the battery housing 22 in the vehicle. For example, the upper and lower flexible portions 54, 56 may be provided with a design that ultimately coordinates with a shape of the structural component to which it will be attached to. The length of the upper and lower flexible portions 54, 56 may vary based on their connection to the structural component. In certain aspects, the upper and lower flexible portions 54, 56 may ultimately be coupled together.

As shown in FIG. 5C, a second aspect provides that the upper and lower flexible portions 54, 56 of the mounting brackets are generally provided with a straight or substantially linear shape (or are considered non-shaped) when in a relaxed state, and are configured to be elastically positioned and conformed to a shape of a respective upper portion or lower portion of the structural component of the vehicle later during the installation process. In still another aspect, not specifically shown, the mounting bracket 34 may be provided with a combination of pre-formed and linear (or non-shaped) flexible portions, based on the installation requirements. For example, the upper flexible portions can be provided as linear portions for ease of guiding the battery housing 22 up and between a limited clearance area between the frame rails 24, 26, while the lower flexible portions may be pre-shaped because they may not need to pass through the same limited clearance area of the chassis between the opposing side rails. While FIGS. 2, 4, and 5 generally illustrate mounting brackets 34 being used with corner area fixation points, it should be understood that additional mounting brackets 34 may be placed generally along any location of the battery housing 22. Still further, the battery housing may be provided with any number of mounting apertures 48, and the specific locations for use of a mounting bracket 34 can be determined by the type of batteries of modules being used, as well as the type of vehicle. In this regard, it is contemplated that the fixation points for a battery housing 22 design can be customized and used with a number of different batteries and vehicles. Still further, with the modular nature of the mounting brackets 34, different types of mounting brackets 34 can be selected for use with the same battery housing 22.

FIGS. 6A-6J are various cross-sectional views of FIG. 2 taken along the line 6-6 and illustrating different arrangements of the mounting brackets 34 coupling the battery housing 22 to the opposing side frame rails 24, 26. It should be understood that this is only a limited number of different designs and techniques that can be used with the present technology, and various other designs and techniques are within the purview of this technology. It is also envisioned that different combinations of aspects shown in FIGS. 6A-6J may also be useful. The specific aspects are not shown to scale, and it should be understood that there may be a predetermined distance desired between the exterior sides of the battery housing 22 and the adjacent frame rails 24, 26 such that they do not contact one another, including during twisting/flexing movement of the frame rails 24, 26. Strategically placed isolators or rubber mounts may also be installed in order to absorb any movement and/or manipulate the angle at which the battery housing 22 may rotate/turn, while keeping the distance between the exterior sides of battery housing 22 and the respective frame rails 24, 26 generally consistent.

Figure 6A:
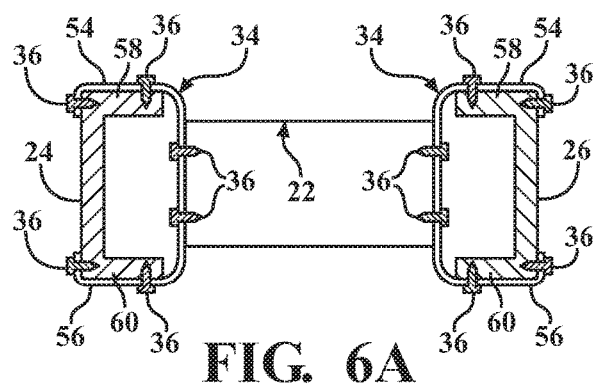
FIGS. 6A-6J are various cross-sectional views of FIG. 2 taken along the line 6-6 and illustrating different arrangements of the mounting brackets coupling the battery housing to the opposing side frame rails.

FIG. 6A is an exemplary design with mounting brackets 34 coupled adjacent to an exterior of the battery housing 22. An upper flexible portion 54 of the mounting bracket 34 may be designed or later shaped to conform with or wrap around an upper, outer portion 58 of the respective frame rail 24, 26 and secured thereto with an appropriate number of fasteners 36. Similarly, a lower flexible portion 56 may be designed or later shaped to conform with or wrap around a lower, outer portion 60 of the respective frame rail 24, 26 and secured thereto with appropriate fasteners 36.

Figure 6E:
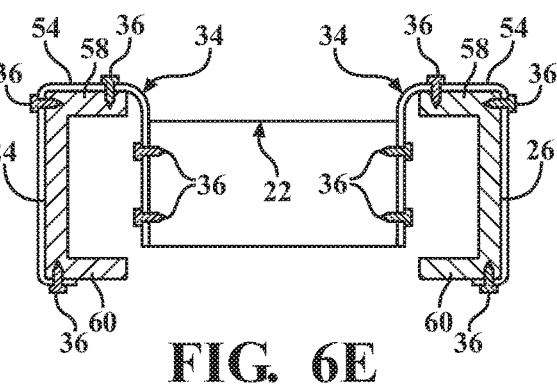
Figure 6B:
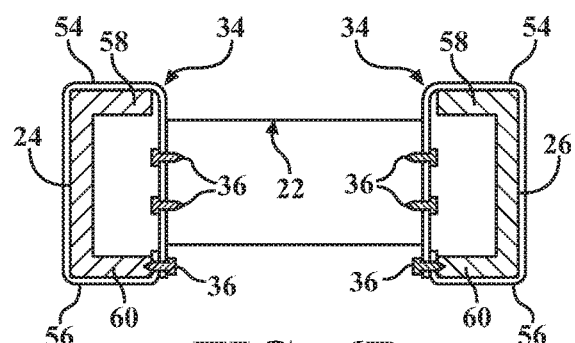

FIG. 6B is another exemplary design with mounting brackets 34 coupled adjacent to an exterior of the battery housing 22, and can also be used with the mounting brackets 34 coupled adjacent to an interior of the battery housing 22. In this design, an upper flexible portion 54 of the mounting bracket 34 is wrapped around almost an entirety of the frame rail 24, 26 and is optionally coupled to both the lower flexible portion 56 of the mounting bracket 34 as well as a lower portion 60 of the respective frame rail 24, 26 using a mechanical fastener.

Figure 6F:
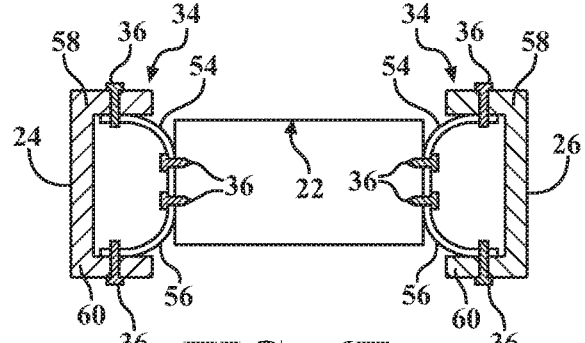
Figure 6C:
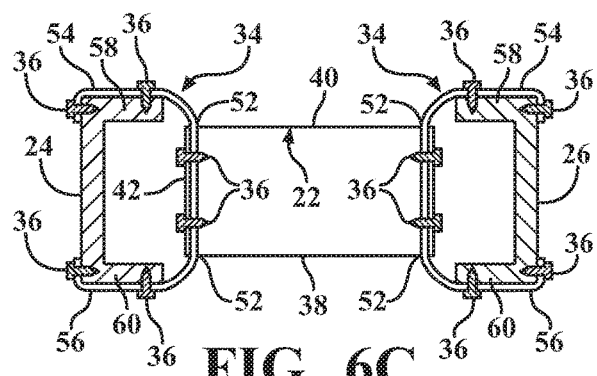

FIG. 6C is an exemplary design with a center portion of the mounting brackets 34 disposed within an interior of the battery housing 22. In this design, the left side is shown with the mounting bracket 34 coupled adjacent to an interior of the battery housing 22 using mechanical fasteners 36, and exiting the battery housing 22 at apertures 52 in the side perimeter portion 42. The right side is shown with the mounting bracket 34 disposed within the interior, but without any mechanical fastener, in order to provide additional flexibility and movement when required. The mounting bracket 34 is shown exiting the battery housing 22 from apertures 52 defined in the cover portion 40 and base portion 38.

Figure 6G:
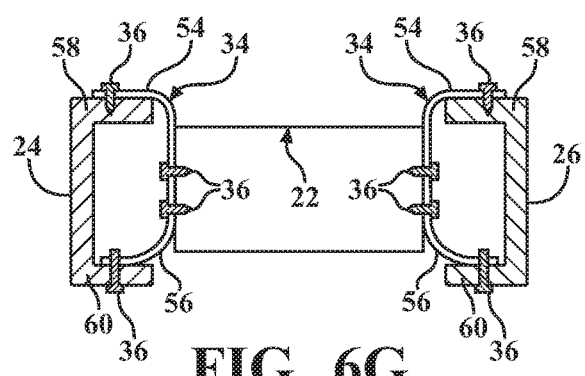
Figure 6D:
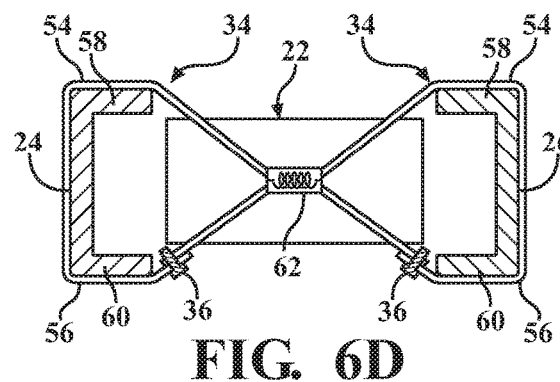

FIG. 6D is another exemplary design where the mounting brackets 34 are secured to one another in what may be referred to as an infinity connection. As shown, the upper and lower flexible portions 54, 56 of the two adjacent mounting brackets 34 are optionally coupled to at least one isolator component 62 disposed with an interior of the battery housing 22, and the upper and lower flexible portions 54, 56 of the mounting brackets 34 are also optionally coupled to one another at a location outside of the battery housing 22. The upper and lower flexible portions 54, 56 of the mounting brackets 34 could alternatively be fastened to the respective frame rail 24, 26. In various aspects, the isolator component 62 may be a three-axis isolator or radial-type isolator, and in some aspects, may include a one of a biasing member, such as a spring, a center-bonded mount, a rubber mount, a flexible mount, or other known passive or active mount that is configured to absorb or assist in directing motion and vibration from twisting/flexing movement of the frame rails 24, 26, and/or configured to permit limited movement of the battery housing 22 during any movement of the structural component of the vehicle. In certain aspects, the isolator component 62 may include a cylindrical or puck-style shaped connector configured to isolate, absorb, or otherwise minimize vibrations.

FIG. 6E is another exemplary design where the mounting brackets 34 only have an upper flexible portion 54 that is wrapped around the upper portion 58 of the frame rail 24, 26. Mechanical fasteners 36 may be used to couple the mounting bracket 34 to an exterior (or interior) of the battery housing 22, as well as to at least one location on the frame rail 24, 26. Although not specifically shown, the reverse configuration can also be provided, where the mounting brackets 34 only have a lower flexible portion 56 that is wrapped around the lower portion 60 and coupled to at least one location on the frame rail 24, 26.

FIG. 6F is another exemplary design where the mounting bracket 34 is coupled adjacent to either an exterior (as shown) or interior portion of the battery housing 22, and the upper and lower flexible portions 54, 56 of the mounting bracket 34 are disposed within an interior of the respective frame rails 24, 26. Mechanical fasteners 36 can optionally be used to couple the mounting bracket 34 to remain within an interior region of the frame rails 24, 26.

FIG. 6G is another exemplary design, similar to FIG. 6F, where the mounting bracket 34 is coupled adjacent to either an exterior (as shown) or interior portion of the battery housing 22, but the upper flexible portions 54 of the mounting brackets 34 are conformed with the exterior of the frame rails 24, 26, and the lower flexible portions 56 of the mounting brackets 34 are disposed within an interior of the respective frame rails 24, 26. Mechanical fasteners 36 can optionally be used to couple the mounting bracket 34 the frame rails 24, 26 at desired locations.

Figure 6H:
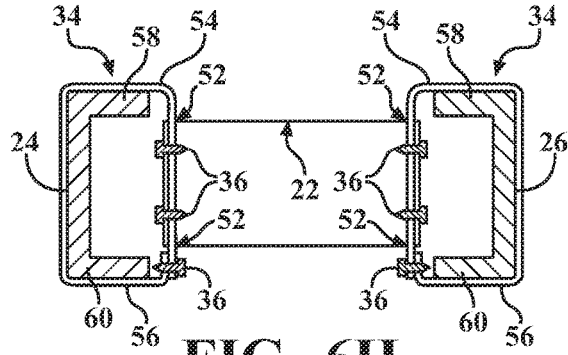

FIG. 6H is another exemplary design where the mounting brackets 34 are not mechanically fastened to the battery housing 22, and instead the mounting bracket 34 generally forms a loop shape, and is secured or mechanically fastened to itself at an appropriate location using mechanical fasteners 36.

Figure 6I:
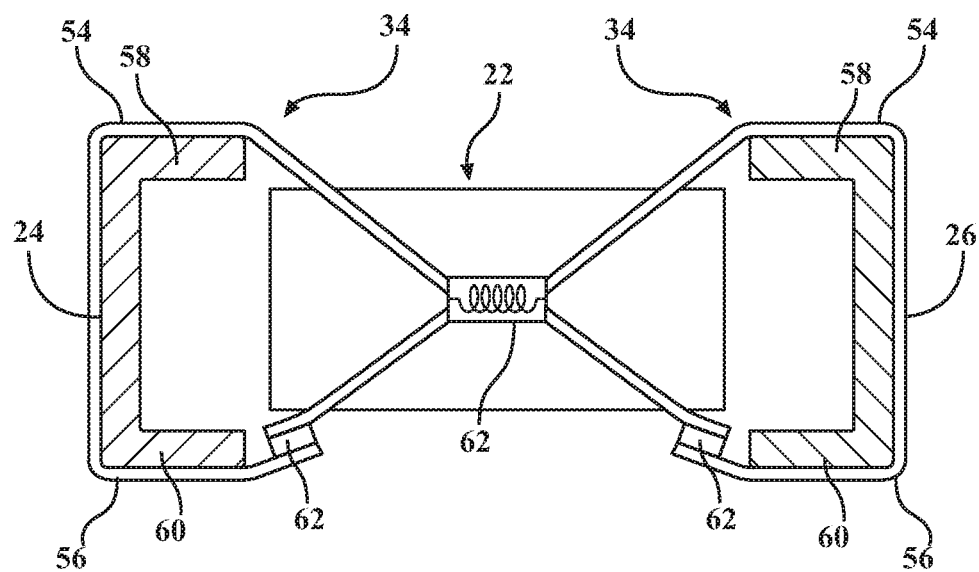
Figure 6J:
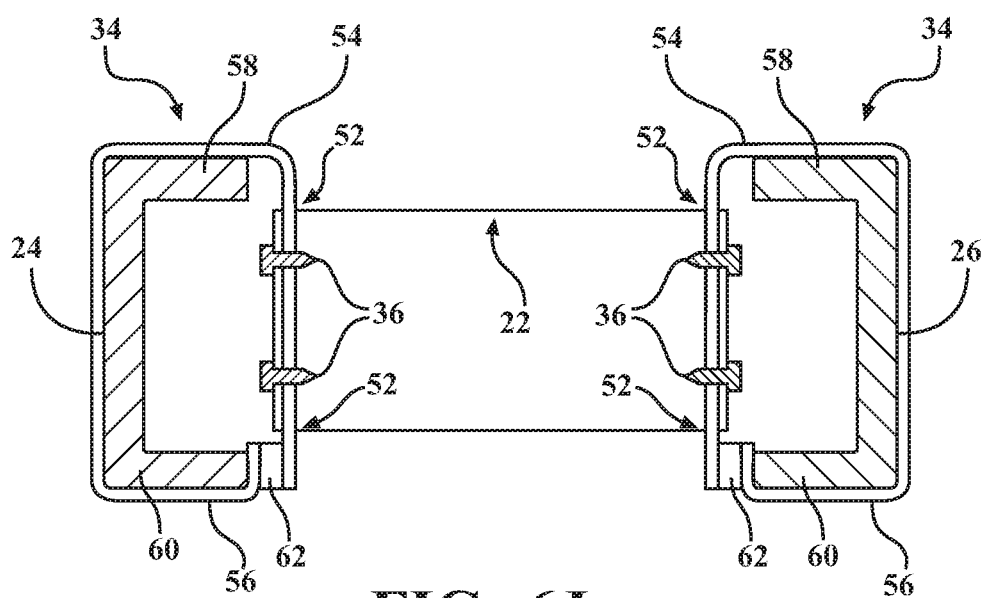

FIGS. 6I and 6J are additional exemplary designs similar to FIGS. 6D and 6H, respectively. However, with FIGS. 6I and 6J, instead of only using mechanical fasteners 36 to couple the lower flexible portions 56 of the brackets 34, FIG. 6I provides one example of using an isolator component 62 to couple ends of the bracket without an attachment to the frame rail, and FIG. 6J provides another example of using an isolator component 62 to couple ends of the bracket with an attachment to the frame rail. It should be understood that various mechanical fasteners 36 and isolator components 62 can be used in any number of different configurations, and there placement is not limited to the specific numbers and locations provided in the examples shown in FIGS. 6A-6J. Depending on the various designs, certain fasteners and/or isolators may be intended for a permanent connection, while other fasteners and/or isolators may be intended for a removably coupled connection.

The present technology provides at least two types of installation configurations/techniques to improve the ease of installation of the battery housing between a somewhat confined location between frame rails. While the following discussion of useful methods will be particularly discussed with respect to the features shown in FIG. 6A, one of skill in the art will understand the methods can be modified to arrive at any of the aspects shown in FIGS. 6B-6H, as well as many other design variations.

Figure 7A:
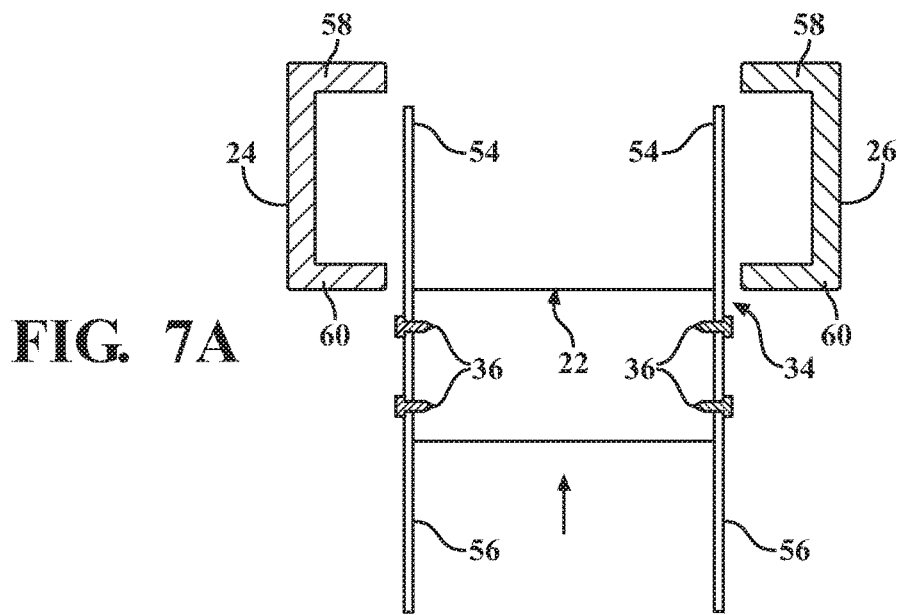
FIGS. 7A-7C are a series of cross-sectional views illustrating a first method of installing the mounting brackets of the battery housing to the opposing side frame rails.
Figure 7B:
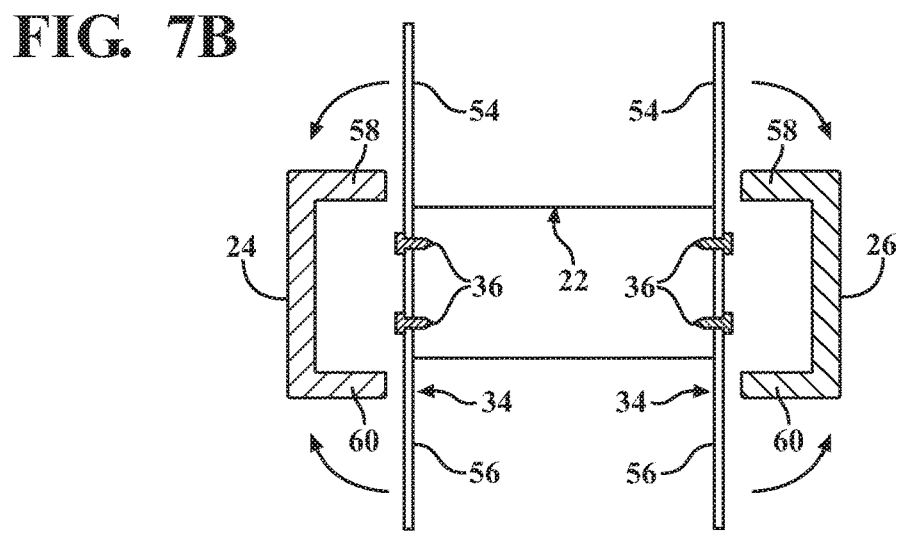
Figure 7C:
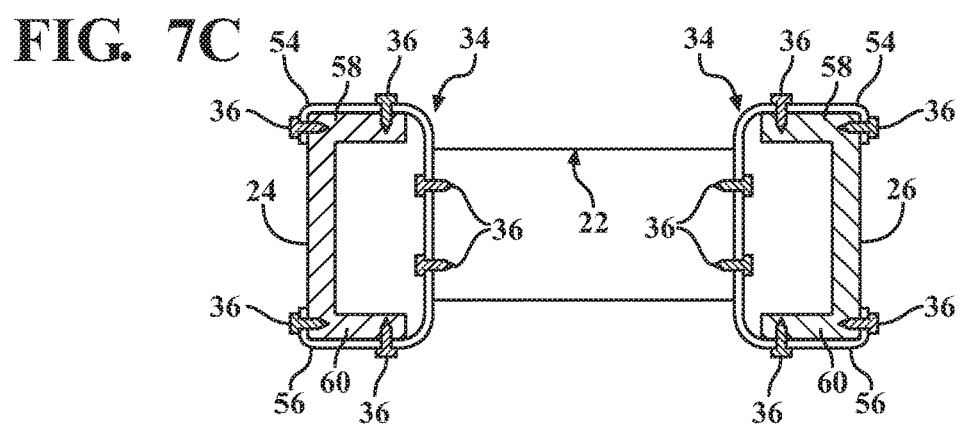

FIGS. 7A-7C are a series of cross-sectional views illustrating a first method of installing the mounting brackets 34 of the battery housing 22 to the opposing side frame rails 24, 26. The first technique includes the use of mounting brackets 34 that are in an initial pre-install position where upper and lower flexible portions 54, 56 of the mounting brackets 34 are in what may be referred to as a relaxed state and are in a substantially straight, or linear, orientation. The mounting brackets 34 are positioned on lateral sides of the battery housing 22 that, in one example, is guided and loaded between frame rails 24, 26 of a vehicle as referenced in FIG. 7A. Because the mounting brackets 34 are substantially straight in the relaxed state, they do not interfere with the placement of the battery housing within the tight spacing between the frame rails 24, 26. Once the battery housing 22 is guided in the loaded position as shown in FIG. 7B between opposing frame rails 24, 26, an upper flexible portion 54 of the mounting bracket 34 may be shaped and conformed by elastically repositioning it adjacent an upper portion 58 of the respective frame rail 24, 26. A lower flexible portion 56 of the mounting bracket 34 may similarly be shaped, conformed, and elastically repositioned adjacent a lower portion 60 of the frame rail 24, 26, resulting in the configuration as provided in FIG. 7C. The process may be repeated for a plurality of mounting brackets 34 or mounting structures. As discussed above, mechanical fasteners 36 can be used to secure the upper and/or lower flexible portions 54, 56 of the mounting brackets 34 to the respective portions 58, 60 of the opposing frame rails 24, 26.

Figure 8A:
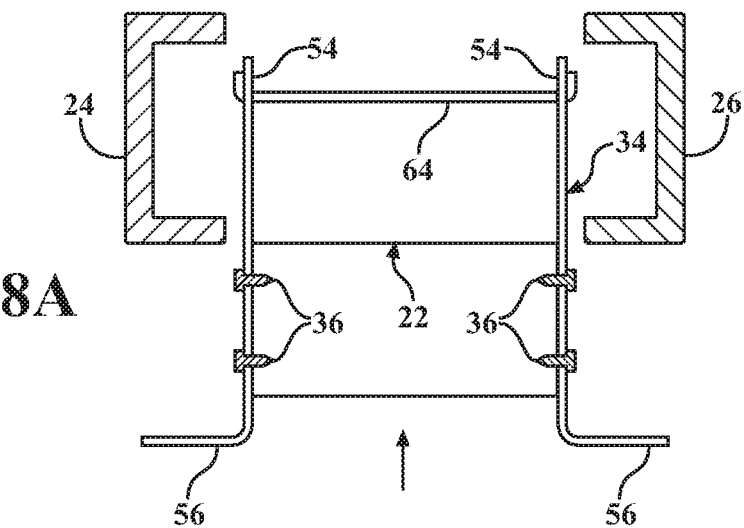
FIGS. 8A-8C are a series of cross-sectional views illustrating a second method of installing the mounting brackets of the battery housing to the opposing side frame rails.
Figure 8B:
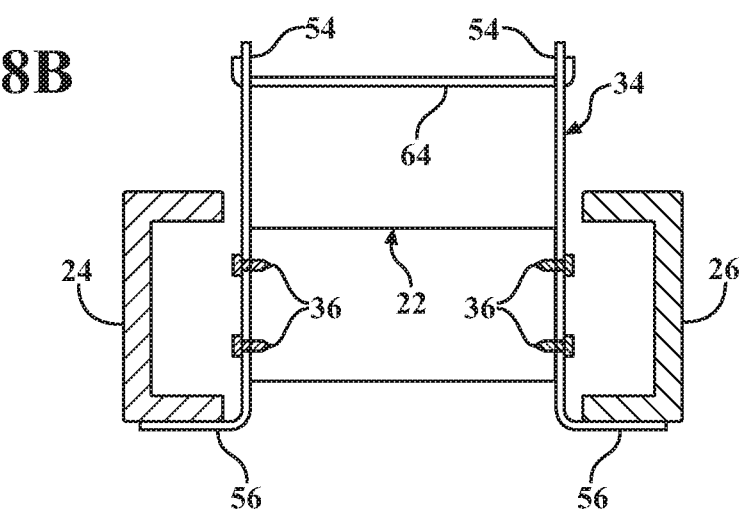
Figure 8C:
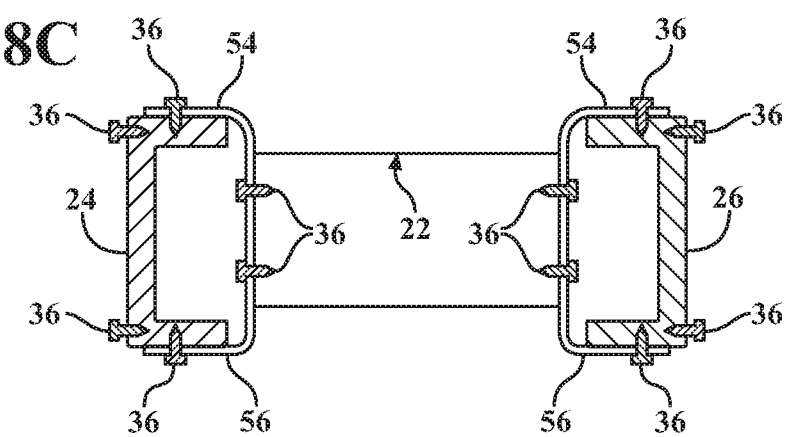

The second technique includes the use of mounting brackets that are pre-formed in a natural state, shaped having a cross-section with flexible ends in a substantially curved orientation, or have a C-shape configuration, and the method includes providing the flexible ends in an initial pre-install, fixed position while the battery housing 22 is guided to the position between the frame rails 24, 26. FIGS. 8A-8C are a series of cross-sectional views illustrating the second method of installing the mounting brackets 34 of the battery housing 22 to the opposing side frame rails 24, 26. In this regard, the upper and/or lower flexible portions 54, 56 of the mounting brackets can be shaped or aligned in a pre-install biased position, provided with a suitable number of fasteners such as one or more locking pin 64 assembly (as shown), a retention clip, or a similar device to temporarily bias the respective ends of the upper flexible portions 54 of the mounting brackets 34 in a substantially vertical position during the installation or removal process as shown in FIG. 8A. In certain aspects, retention clips can be integrated into the battery housing, or be provided as a separate installation tool. With the example of a retention clip, the retention clip will bias the upper portions of adjacent C-shaped brackets by coupling the respective upper portions together. One retention clip can be provided for each set of two C-shaped brackets. It may not be necessary for the lower portions 56 of the mounting brackets 34 to be biased because the lower portions 56 will not likely interfere with the loading or unloading of the battery housing 22 between the frame rails 24, 26. Once in a loaded position as shown in FIG. 8B, locking pin 64 and/or the retention clips can be removed, and by moving to their natural shaped state, the upper flexible portions 54 of the bracket may clamp down on the respective frame rails 24, 26. Individual fasteners 36 may not be required to secure the mounting brackets 34 to the frame rails 24, 26 at all of the desired positions.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A battery housing for securing a plurality of batteries to a structural component of a vehicle, the battery housing comprising:

a base portion configured to receive at least one battery;
a cover portion;
a side wall perimeter portion extending between the base portion and the cover portion;
a plurality of mounting brackets coupled to the battery housing and configured for removably securing the battery housing to the structural component of the vehicle, each mounting bracket includes at least one flexible portion and is configured to permit limited movement between the battery housing and the structural component, the plurality of mounting brackets being fastened to the side wall perimeter portion of the battery housing; and
an isolator component coupled to two adjacent mounting brackets, the isolator component being located between the two adjacent mounting brackets, the isolator component being configured to permit limited movement of the battery housing during any movement of the structural component of the vehicle.

2. The battery housing according to claim 1, wherein the flexible portion of each mounting bracket is configured to be elastically positioned and conformed to a shape of at least an upper portion of the structural component of the vehicle.

3. The battery housing according to claim 1, wherein the plurality of mounting brackets are mechanically fastened to an exterior of the side wall perimeter portion of the battery housing.

4. The battery housing according to claim 1, wherein the plurality of mounting brackets are mechanically fastened to an interior of the side wall perimeter portion of the battery housing.

5. The battery housing according to claim 1, wherein each of the plurality of mounting brackets has an initial pre-install position being in a substantially straight, relaxed state.

6. The battery housing according to claim 1, wherein the each of the plurality of mounting brackets is pre-formed having a substantially C-shaped cross-section with flexible ends.

7. The battery housing according to claim 6, further comprising a plurality of fasteners configured to bias and/or retain the flexible ends of each mounting bracket in a fixed position during installation of the battery housing in the vehicle.

8. The battery housing according to claim 1, wherein the isolator component comprises a three-axis isolator.

9. A mounting assembly for retaining a battery housing in a vehicle, the mounting assembly comprising:
a vehicle frame chassis having at least two opposing frame rails;
a battery housing disposed between the two opposing frame rails;
a plurality of mounting brackets coupled to the battery housing and configured for removably securing the battery housing to the two opposing frame rails of the vehicle frame chassis, each mounting bracket including at least one flexible portion that is positioned to conform to a shape of at least a portion of the respective frame rail, the plurality of mounting brackets being fastened to a side wall perimeter portion of the battery housing; and
an isolator component coupled to two adjacent mounting brackets, the isolator component being located between the two adjacent mounting brackets, the isolator component being configured to permit limited movement of the battery housing during any movement of the opposing frame rails with respect to one another.

10. The mounting assembly according to claim 9, wherein the battery housing includes a base portion configured to receive at least one battery, a cover portion, and a side wall perimeter portion extending between the base portion and cover portion, and each frame rail has a substantially I-shaped or C-shaped cross-section.

11. The mounting assembly according to claim 10, wherein the plurality of mounting brackets are mechanically fastened adjacent to an exterior of the side wall perimeter portion of the battery housing.

12. The mounting assembly according to claim 10, wherein the plurality of mounting brackets are integrated with the battery housing and mechanically fastened to an interior of the side wall perimeter portion of the battery housing.

13. The mounting assembly according to claim 9, wherein at least one of the plurality of mounting brackets is mechanically fastened to an upper portion of a respective one of the frame rails.

14. The mounting assembly according to claim 13, wherein the at least one of the plurality of mounting brackets is further mechanically fastened to a lower portion of the respective frame rail.

15. A method for removably securing a battery housing in a vehicle using a flexible bracket mounting system, the method comprising:
guiding the battery housing to a position between opposing frame rails of a vehicle frame chassis, the battery housing comprising a plurality of mounting brackets, each mounting bracket including at least one flexible portion;
shaping the flexible portions of the plurality of flexible mounting brackets to conform to a shape of a portion of the respective opposing frame rails; and
securing the plurality of mounting brackets to portions of the respective opposing frame rails of the vehicle frame chassis,
wherein the plurality of mounting brackets are configured to permit limited movement of the battery housing during any movement of the opposing frame rails with respect to one another,
the plurality of mounting brackets coupled to a side wall perimeter portion of the battery housing and configured for removably securing the battery housing to the two opposing frame rails of the vehicle frame chassis, the at least one flexible portion of each mounting bracket being positioned to conform to a shape of at least a portion of a respective one of the opposing frame rails, and two adjacent mounting brackets being coupled by an isolator component, the isolator component being located between the two adjacent mounting brackets.

16. The method according to claim 15, wherein each mounting bracket includes an upper flexible portion and a lower flexible portion, and the method comprises:
securing each upper flexible portion to an upper portion of a respective one of the opposing frame rails; and
securing each lower flexible portion to a lower portion of a respective one of the opposing frame rails.

17. The method according to claim 15, wherein each of the plurality of mounting brackets has an initial pre-install position of being in a substantially straight, relaxed state prior to the step of shaping the flexible portions.

18. The method according to claim 15, wherein each of the plurality of mounting brackets is pre-formed having a shaped cross-section with flexible ends, and the method includes biasing and/or retaining the flexible ends of each mounting bracket in a fixed position while the battery housing is guided to the position between the opposing frame rails of the vehicle frame chassis.

\* \* \* \* \*

UNITED STATES PATENT AND TRADEMARK OFFICE
CERTIFICATE OF CORRECTION

PATENT NO. : 11,325,453 B2
APPLICATION NO. : 16/718677
DATED : May 10, 2022
INVENTOR(S) : Friedman It is certified that error appears in the above-identified patent and that said Letters Patent is hereby corrected as shown below:

In the Claims

Claim 11, Column 12, Line 9: "fastened adjacent to" should be --fastened to--

Signed and Sealed this
Twenty-eighth Day of June, 2022

*Katherine Kelly Vidal*

Katherine Kelly Vidal
*Director of the United States Patent and Trademark Office*